US010234670B2

(12) United States Patent
Horner

(10) Patent No.: US 10,234,670 B2
(45) Date of Patent: Mar. 19, 2019

(54) MICROSCOPE FOCUSING DEVICE

(71) Applicant: Hikari Instruments, L.L.C., Scottsdale, AZ (US)

(72) Inventor: Timothy Horner, Tucson, AZ (US)

(73) Assignee: Hikari Instruments, LLC, Scottsdale, AZ (US)

( * ) Notice: Subject to any disclaimer, the term of this patent is extended or adjusted under 35 U.S.C. 154(b) by 0 days.

(21) Appl. No.: 15/473,398

(22) Filed: Mar. 29, 2017

(65) Prior Publication Data
US 2018/0284415 A1    Oct. 4, 2018

(51) Int. Cl.
*G02B 21/24*    (2006.01)
*G02B 21/02*    (2006.01)
*G02B 21/06*    (2006.01)
*G02B 7/00*    (2006.01)

(52) U.S. Cl.
CPC .......... *G02B 21/241* (2013.01); *G02B 7/005* (2013.01)

(58) Field of Classification Search
CPC ........ G02B 7/003; G02B 7/004; G02B 7/005; G02B 7/02; G02B 21/241; G02B 21/02; G02B 21/06; G02B 21/32
USPC ............... 359/368, 379, 381, 383, 385, 390; 250/442.11, 201.3
See application file for complete search history.

(56) References Cited

U.S. PATENT DOCUMENTS

| | | | | |
|---|---|---|---|---|
| 5,693,938 A | * | 12/1997 | Marchman | B82Y 20/00 250/234 |
| 5,790,710 A | * | 8/1998 | Price | G01N 15/147 250/201.3 |
| 6,967,335 B1 | * | 11/2005 | Dyer | G02B 21/32 250/442.11 |

FOREIGN PATENT DOCUMENTS

JP    2007033934 A    *   2/2007    .............   G02B 21/26

OTHER PUBLICATIONS (See Office action document for correct citation—denoted as reference U).*
(See Office action document for correct citation—denoted as reference V).*
Photographs of a microscope focusing device, photographed Mar. 20, 2017, and available to the public at least as early as that date, (three pages).

* cited by examiner

*Primary Examiner* — Frank G Font
(74) *Attorney, Agent, or Firm* — IPTechLaw

(57) ABSTRACT

Implementations of piezoelectric operated microscope focusing devices may include: a first block, having a first side and a second side, the first side coupled to a body of a microscope through four or more screws. The device may also include a second block, having a first surface, a second surface, and a side surface. The side surface may be coupled to the second side of the first block. The second surface of the second block may be configured to couple with an objective of the microscope. A piezoelectric operated microscope focusing device may also include an opening on the first surface of the second block. The opening may be configured to couple to an illuminator of a microscope. The opening may have a substantially rounded portion and an adapter orientated substantially perpendicular to the first block of the device. The adapter may include dove tail projections and mounting screws.

19 Claims, 6 Drawing Sheets

MICROSCOPE FOCUSING DEVICE

BACKGROUND

1. Technical Field

Aspects of this document relate generally to attachments for microscopes, such as modular focusing to increase the clarity of viewing a specimen.

2. Background

Visual microscopes include objectives placed over a sample to be viewed which is then typically illuminated by a light source to permit optimal review of the sample through the objectives. In many microscopes, viewing optics are combined with the objectives to allow for more comfortable review of the sample and/or additional magnification of the image. The height of the objective above the sample is used to adjust the focus/depth of the image visible to the user of the visual microscope.

SUMMARY

Implementations of piezoelectric operated microscope focusing devices may include: a first block, having a first side and a second side, the first side configured to couple to a body of a microscope through four or more screws. The device may also include a second block, having a first surface, a second surface, and a side surface. The side surface may be coupled to the second side of the first block. The second surface of the second block may be configured to couple with an objective of the microscope. The device may also include an opening on the first surface of the second block. The opening may be configured to couple to an illuminator of a microscope. The opening may have a substantially rounded portion and an adapter orientated substantially perpendicular to the first block of the device. The adapter may include dove tail projections and mounting screws.

Implementations of piezoelectric operated microscope focusing devices may include one, all, or any of the following:

A piezoelectric material contained within a cylinder positioned between the first side and the second side of the first block. The piezoelectric material may be subjected to bias force using a spring.

The piezoelectric material may include one of a crystal or a ceramic.

The four or more screws may be arranged in a rectangular formation.

The illuminator may further include one or more viewing lenses.

A piezoelectric operated microscope focusing device may also include a bracket coupled to the second surface of the second block configured to couple with the objective of the microscope. The bracket may comprise two or more square shaped wings and a pin. The first wing of the bracket may be positioned on an edge of the second surface opposite the first block. The first wing may include a thumb screw configured to secure the objective of the microscope. The pin of the bracket may be positioned adjacent the second wing. The pin may be configured to stop and position the objective when the objective is inserted into the two or more square shaped wings.

Implementations of piezoelectric operated microscope focusing devices may include: a first block having a first side and a second side. The first side may be configured to couple to a body of a microscope through four or more screws. The device may have a second block having a first surface, a second surface, and a side surface. The second surface may be coupled to the second side of the first block. The second surface of the second block may be configured to couple with an objective of the microscope. The device may also have an opening in the first surface of the second block. The opening may be configured to couple to an illuminator of a microscope. The opening may have a substantially square shaped portion and an adapter orientated substantially parallel to the first block of the device. The adapter may include two dove tail projections and at least one mounting screw.

Implementations of piezoelectric operated microscope focusing devices may include one, all, or any of the following:

A piezoelectric material may be contained within a cylinder positioned between the first side and the second side of the first block. The piezoelectric material may be subjected to bias force through a spring.

The piezoelectric material may be one of a crystal and a ceramic.

The device may further include four or more screws where the four or more screws may be arranged in a rectangular formation.

The illuminator may further include at least one view optic.

A piezoelectric operated microscope focusing device may also include a bracket coupled to the second surface of the second block configured to couple with the objective of the microscope. The bracket may comprise two or more square shaped wings and a pin. A first wing of the bracket may be positioned on an edge of the second surface opposite the first block. The first wing may include a thumb screw configured to secure the objective of the microscope. The pin of the bracket may be positioned adjacent the second wing. The pin may be configured to stop and position the objective when the objective is inserted into the two or more square shaped wings.

Implementations of piezoelectric operated microscope focusing devices may include: A first block having a first side and a second side. The first side may be configured to couple to a body of a microscope through two or more screws. The device may also have a second block having a first surface, a second surface, and a side surface. The side surface may be coupled to the second side of the first block. The device may also have an opening in the first surface of the second block configured to couple with a light source of the microscope. The device may also have a bracket coupled to the second surface of the second block configured to couple with an objective of the microscope. The bracket may include two or more flanges and a pin. A first flange may be positioned on an edge of the second surface opposite the first block. The first wing may include a thumb screw configured to secure the objective of the microscope. The pin may be positioned adjacent the second wing and may be configured to stop and position the objective while the objective is inserted into the two or more flanges.

Implementations of piezoelectric operated microscope focusing devices may include one, all, or any of the following:

A piezoelectric material may be contained within a cylinder positioned between the first side and the second side of the first block. The piezoelectric material may be subjected to bias force using a spring.

The piezoelectric material may be one of a crystal and a ceramic.

The device may further include four or more screws, the four or more screws may be arranged in a rectangular formation.

The light source may be an illuminator.

The opening may include a substantially rounded portion and an adapter oriented substantially perpendicular to the first block of the device. The adapter may include two dove tail projections and at least one mounting screw.

The opening may include a substantially square shaped portion and an adapter oriented substantially parallel to the first block of the device. The adapter may include two dove tail projections and at least one mounting screw.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended piezoelectric operated microscope focusing device will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such piezoelectric operated microscope focusing device, and implementing components and methods, consistent with the intended operation and methods.

Figure 1:
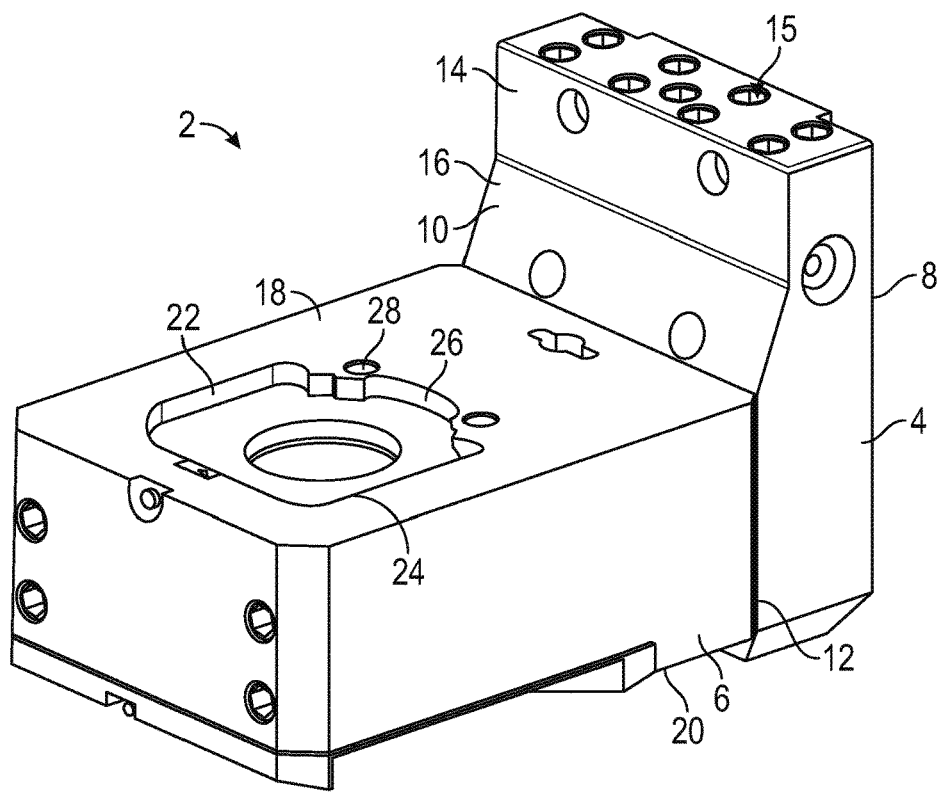
FIG. 1 is a perspective view of an implementation of a piezoelectric operated microscope focusing device.
Figure 4:
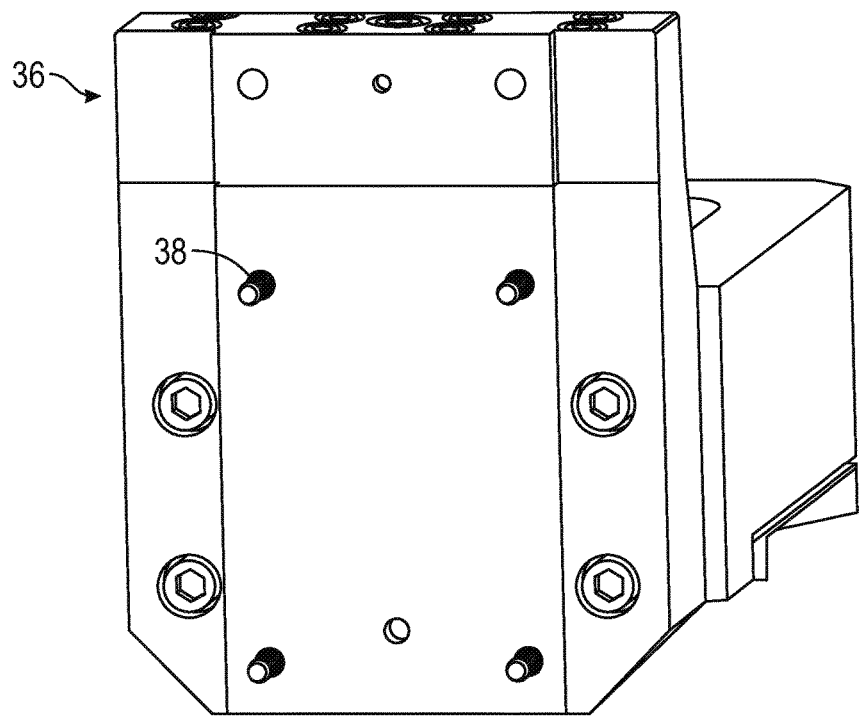
FIG. 4 is a back view of an implementation of a piezoelectric operated microscope focusing device.

Referring to FIG. 1, an implementation of a piezoelectric operated microscope focusing device 2 is illustrated. The device includes a first block 4 coupled to a second block 6. The first block 4 has a first side 8 and a second side 10. The first side 8 of the first block 4 is configured to couple with the body of a microscope through two or more screws 38 as can be seen in FIG. 4. An example of a microscope that may be used with device implementations disclosed herein includes those marketed under the tradename ECLIPSE LV150N/LV150NA Industrial Microscope by Nikon Corporation of Tokyo, Japan. The second side 10 of the first block 4 is coupled to the side surface 12 of the second block 6. The first block 4 and the second block 6 may be coupled through screws, glue, adhesive, a combination thereof or any other suitable fastener known in the art. In this implementation, the first block 4 also has a top portion 14 and a bottom portion 16. The top portion 14 is fastened to the bottom portion 16 through a plurality of screws 15. In other implementations, the top portion 14 may be fastened to the bottom portion by other fastening methods including any previously described.

The second block 6 of the device 2 includes a first surface 18, a second surface 20 and a side surface 12. In the first surface 18 of the second block there is an opening 22. The opening 22 is configured to couple with a light source of a microscope. In various implementations, the light source may be an illuminator. The illuminator may include at least one viewing optic through which the user views the sample on the microscope. In some implementations, the illuminator may also include one or more viewing lenses. In various implementations, as illustrated in FIG. 1, the opening 22 may have a substantially square shaped portion 24. As can be seen, the corners of the substantially square shaped portion are rounded. In other implementations, the opening may have a different shape, such as by non-limiting example, the circular shape illustrated in FIG. 6, a rectangular shape, an elliptical shape or any other closed shape. The opening may also include an adapter 26 which, in various implementations, may be orientated substantially parallel with the first block 4 of the device. In other implementations, the adapter 26 may be orientated in other directions, however, depending on the particular structure of the illuminator to which the device is to be coupled. The adapter 26 may include dove tail projections on each side and mounting screw openings 28. Those skilled in the art will also recognize the projections as each including a reentrant opening.

The device 2 may be made of steel, steel alloys, including zinc, aluminum, anodized aluminum, plastic, including rigid plastics, any combination thereof and any other suitable material known in the art. Each block 4 and 6 of the device 2 may be made of individual sheets of material that may be fastened together through nails, screws, glues, adhesives and other suitable material.

Figure 2:
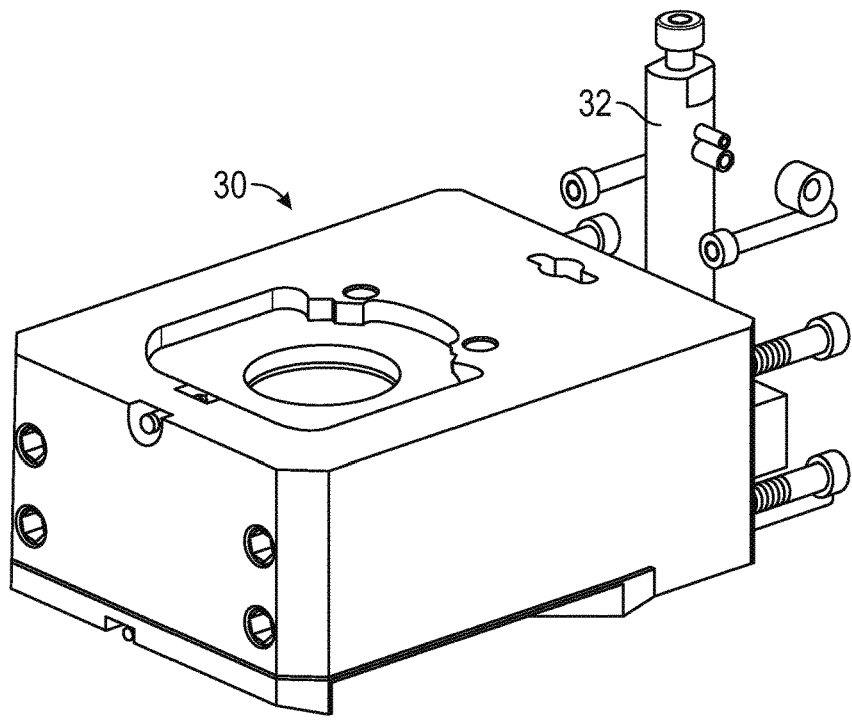
FIG. 2 is a front perspective view of an implementation of a piezoelectric operated microscope focusing device having the first block removed.
Figure 3:
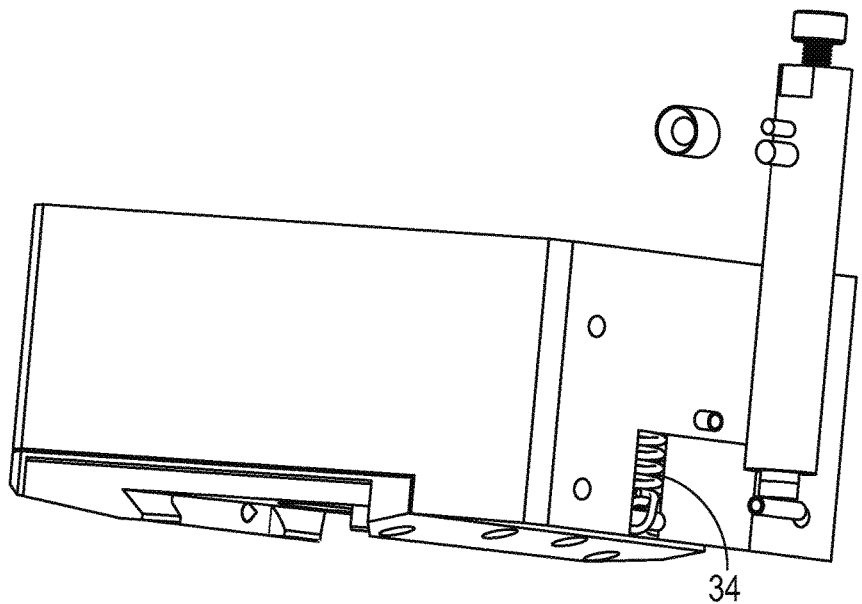
FIG. 3 is a back perspective view of an implementation of a piezoelectric operated microscope focusing device having the first block removed.

Referring now to FIG. 2, an implementation of the device 30 is illustrated having the casing of the first block removed. This view illustrates a cylinder 32 positioned between the first side and the second side of the first block. Within the cylinder 32 a piezoelectric material is contained. The piezoelectric material may include a crystal, such as by non-limiting example, quartz, a ceramic, or other materials in the art known to have piezoelectric properties. The piezoelectric effect is the ability of certain materials to generate an alternating current voltage when subjected to mechanical stress or vibration. Here, the piezoelectric material may be subjected to bias force using a spring 34 as illustrated in FIG. 3. The piezoelectric effect of the material may allow the focuser to perform very precise adjustments to the focus of a microscope as the thickness of the second block is changed through movement of the piezoelectric material, thereby changing the distance between the viewing optic of the illuminator and the objectives of the microscope.

Referring now to FIG. 4, the first side 36 of the first block is illustrated. The first block may be mounted to the body of a microscope through two or more screws 38. The two or more screws 38 may be arranged in a vertical line, a horizontal line, or a diagonal line. In other implementations, four or more screws 38 may be used. The four or more screws 38 may be arranged in a rectangular formation. The use of four or more screws may provide a more secure attachment to a microscope body while placing less stress on the screws and the body of the focuser device.

Figure 5:
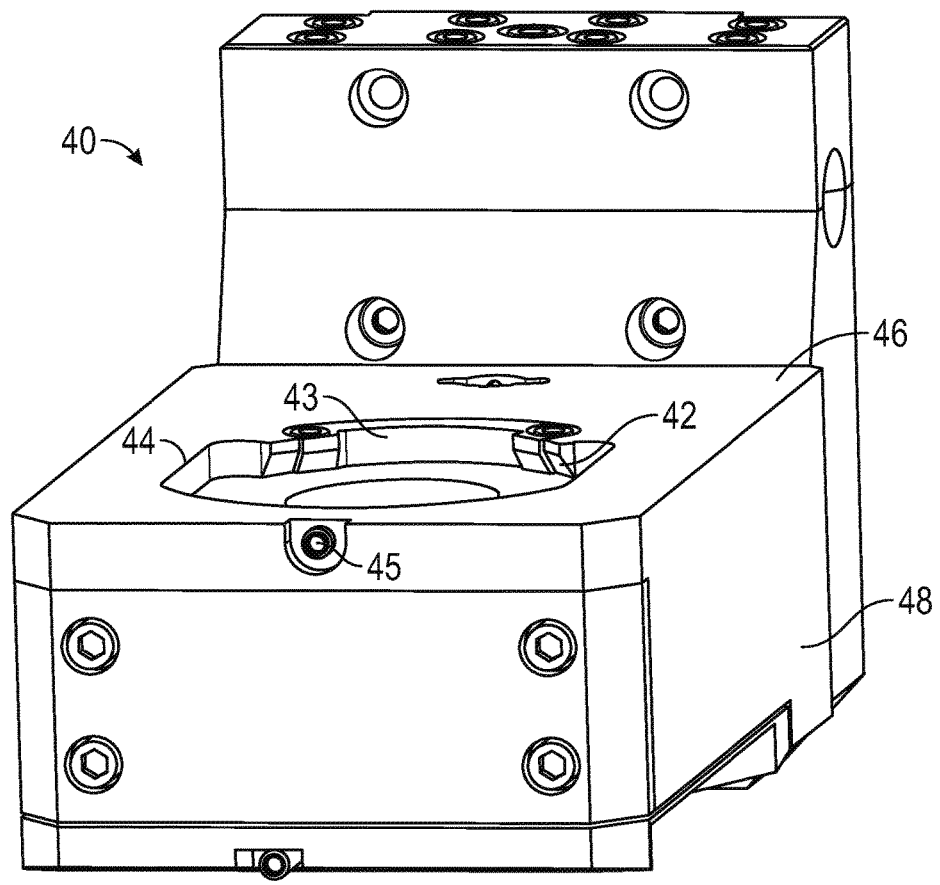
FIG. 5 is a front view of an implementation of a piezoelectric operated microscope focusing device.

Referring to FIG. 5, a front view of an implementation of the focusing device 40 is illustrated. An implementation of the shape of the projections 42 on the opening 44 on the first surface 46 of the second block 48 is shown. A thumb screw 45 is also illustrated opposite the adapter 43. The thumb screw 45 may be used to aid in securing the opening 44 of the device to an illuminator of a microscope.

Figure 6:
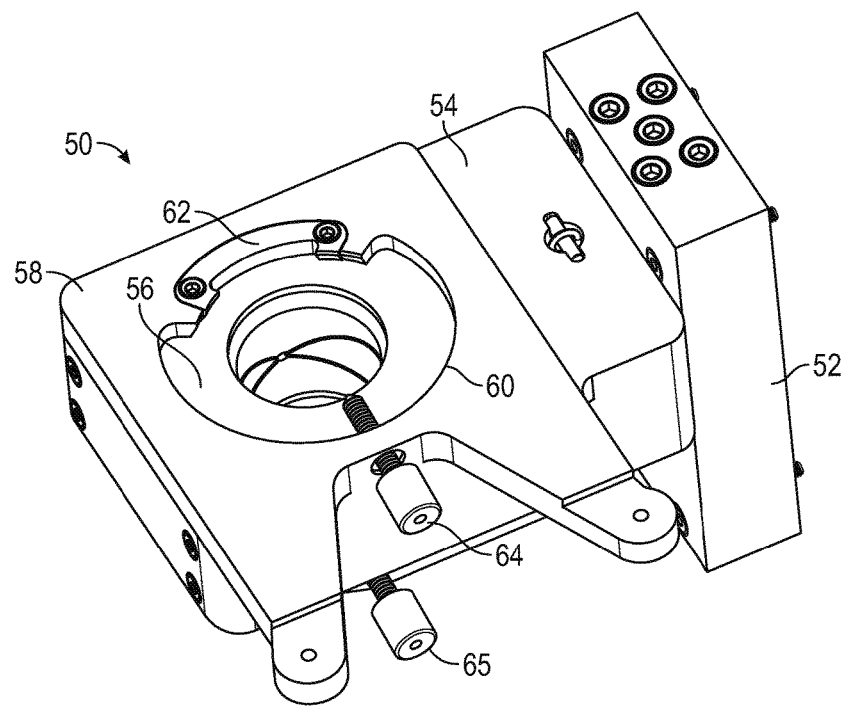
FIG. 6 is a top view of another implementation of a piezoelectric operated microscope focusing device.

Referring to FIG. 6, another implementation of a piezoelectric operated microscope focusing device 50 is illustrated. This implementation includes a first block 52 coupled to a second block 54. The second block 54 includes an opening 56 configured to couple to an illuminator of a microscope as previously described. The opening has a substantially round portion 60 and an adapter 62. The adapter 62 is orientated substantially perpendicular to the first block 52 of the device 50, meaning that the adapter is positioned about ninety degrees away from the first block 52 of the device 50. In some implementations, the device 50 may include thumb screws 64 or other suitable fasteners to aid in securing the device to the illuminator and/or the objective portion of the microscope. In this particular implementation, a screw 64 is located near the first surface of the second block to secure the device to an illuminator or light source of a microscope. There is also a screw 65 located near the second surface of the second block 54 to secure the device 50 to the objective of the microscope.

Figure 7:
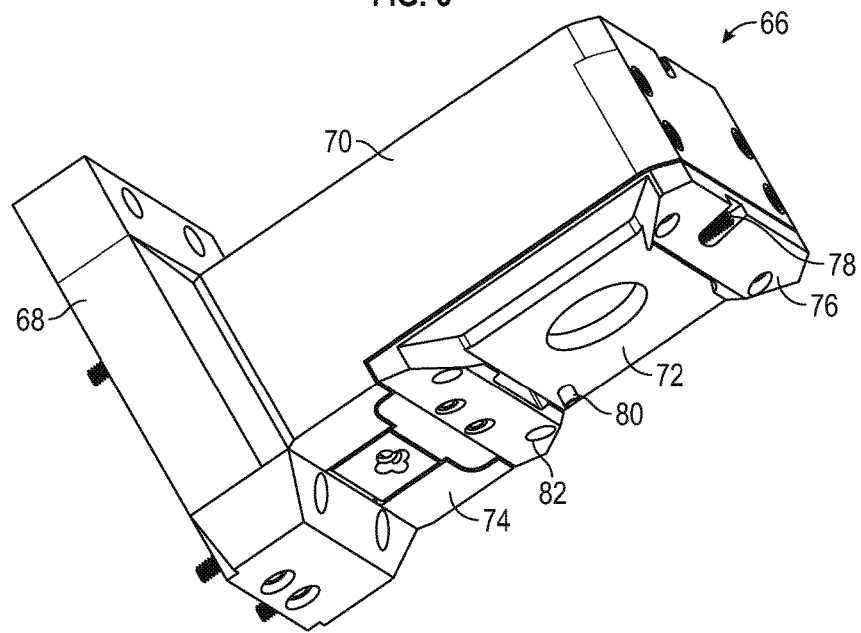
FIG. 7 is a bottom perspective view of an implementation of a piezoelectric operated microscope focusing device.

Referring to FIG. 7, a bottom view of an implementation of a device implementation 66 is illustrated. The device 66 includes a first block 68 and a second block 70 coupled together. A bracket 72 designed to couple with an objective of a microscope is coupled to a second surface 74 of the second block 70. The bracket 72 may be coupled to the second block 70 through screws, adhesive or other suitable fasteners known in the art. In various implementations, the bracket may include two or more square shaped wings and a pin. A first wing 76 may be positioned on an edge of the second surface 74 opposite the first block 68. The first wing 76 may include a thumb screw 78 configured to secure an objective of the microscope. The pin 80 of the bracket 72 is positioned adjacent the second wing 82 and is configured to stop the movement of the objective in between the two wings and position the objective of a microscope at the proper location to align the objectives with the optics in the illuminator. In other implementations, the bracket may include flanges.

Figure 8:
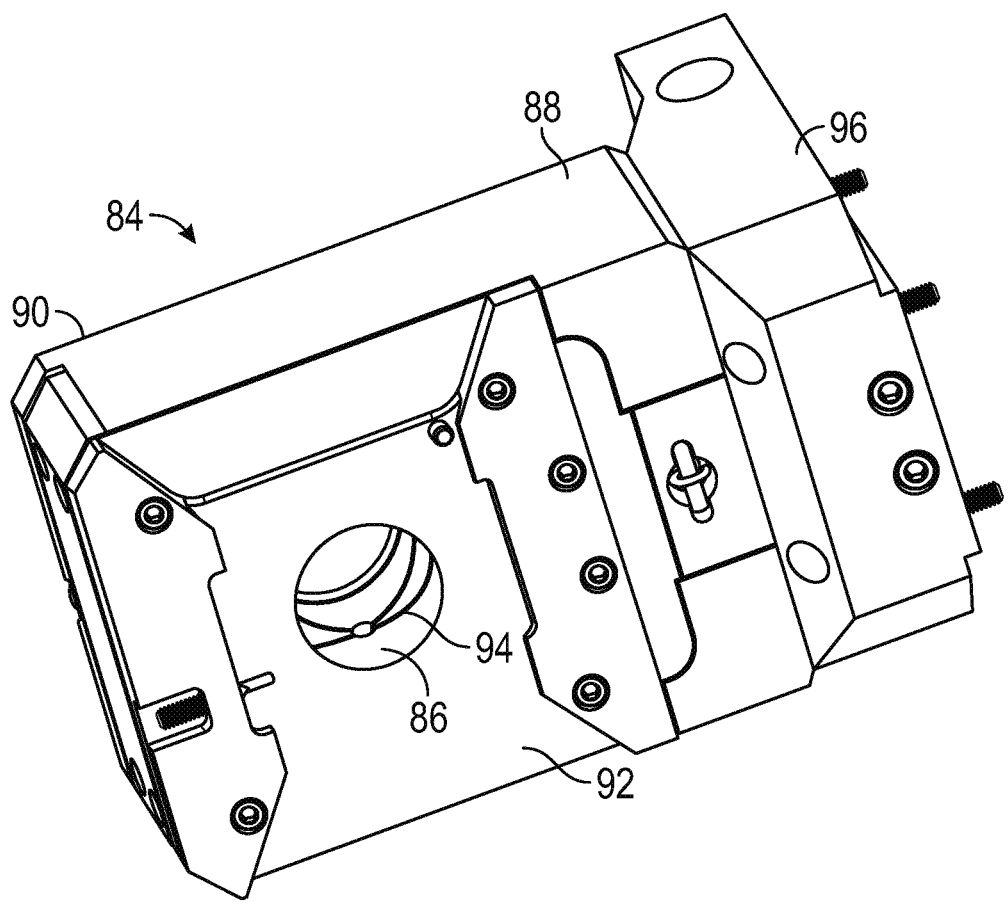
FIG. 8 is a bottom view of an implementation of a piezoelectric operated microscope focusing device.

Referring to FIG. 8, a bottom view of a device 84 implementation is illustrated. A shaft 86 is located in the second block 88 of the device 84 between the first surface 90 and the second surface 92. A top view of this shaft is illustrated in FIG. 6. An inner shape can be seen within the shaft. The inner shape is made of two independently moving blocks that are capable of sliding relative to the internal structure of the device as the distance between the top and bottom surfaces of the second block change under piezoelectric movement. In some implementations, the shape may be a parallelogram. The shape may aid to smooth movement of the objectives and illuminator relative to each other under the influence of the piezoelectric effect of the piezoelectric material in the first block 96.

Figure 9:
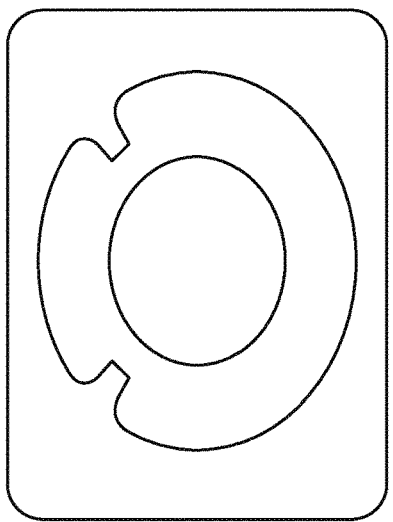
FIG. 9 is a top view of an implementation of an adapter plate for an implementation of a piezoelectric operated microscope focusing device.
Figure 10:
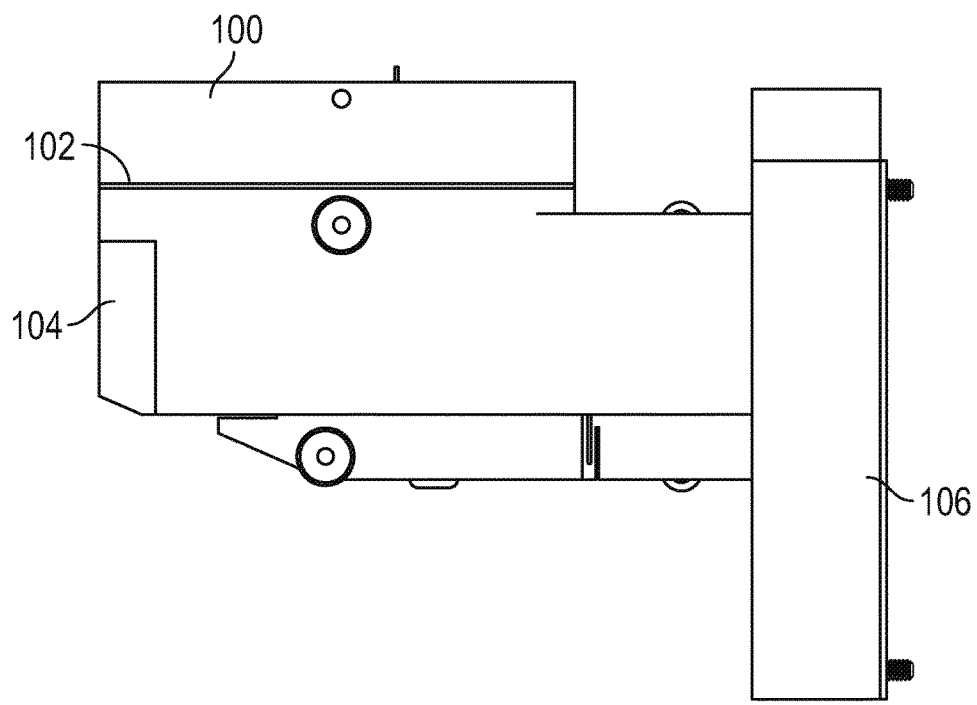
FIG. 10 is a side view of an implementation of an adapter plate coupled to an implementation of a piezoelectric operated microscope focusing device.

Referring to FIG. 9, a top view of an adapter plate 98 is illustrated. An adapter plate may be used to couple the device to a different model of microscope than the one previously described. For instance, the adapter plate could be used to couple an illuminator of a older model of a Nikon industrial microscope to the piezoelectric operated microscope focusing device as previously described without requiring the focusing device to have the specific structure needed to couple to the particular illuminator already. In this way, the adapter plate adapts the focusing device so that it can fit multiple illuminator types without requiring physical changes to the focusing device itself. Referring to FIG. 10, the adapter plate 100 may be coupled to the first surface 102 of the second block 104 of the device where the second block is coupled to the first block 106 of the device as previously described so it can couple with an illuminator. The adapter 100 may be coupled to the device through screws or other suitable methods known in the art. The shape of the opening in the adaptor plate may be any disclosed herein and may include any of the adapter types disclosed herein as well.

Referring to Appendix A—"Microscope Components for Reflected Light Applications" by Nikon Corporation of Tokyo Japan, the disclosure of which is herein incorporated by reference, the attachment of various implementations of the piezoelectric operated microscope focusing device to a Nikon CFI60 Microscope will now be described. The CFI60 is an abbreviation for Chromatic Aberration-Free, Infinity optical design with 60 mm par-focal distance. The implementation of the device illustrated at least in FIGS. 1, 4, and 5 may be used to convert the Nikon IM-4 (or IM-3) microscope support arm disclosed in Appendix A to a precision, piezo-driven nosepiece positioner/focuser. Specifically looking at page 4 of Appendix A, the four screws on the Nikon IM-4 focusing device may be removed and the piezoelectric focusing device may be coupled to the IM-4 (or IM-3) using the fasteners 38 as illustrated in FIG. 4. This configuration may be used with the entire CFI60 product line and with all products using the lower square dovetail nosepieces. The square shaped adapter shown at least as 43 in FIG. 5 has a corresponding shape with the square dovetail nosepieces and may also be used with the older Nikon Illuminator "Universal Epi-Illuminator EPI-U" as shown on page 29 of Appendix A on the top of the arm(s) while also using the CFI60 Eclipse lower square dovetail nosepiece on the bottom—the CFI60 Eclipse is illustrated on page 18 of Appendix A.

Still referring to Appendix A, the possible configurations implementation of the piezoelectric operated microscope focusing device illustrated in FIG. 6 with a Nikon CFI60 Microscope will be described. This implementation of the device may be used to convert a manual Nikon IM-4 (or IM-3) microscope support arm to a precision, piezo-driven nosepiece positioner/focuser. Referring to page 32 of Appendix A, the device in FIG. 6 may be used with the CFI60 upper illuminator systems using the older lower round dovetail nosepieces on the bottom. The adapter 62 as illustrated in FIG. 6 has a corresponding shape with the round dovetail nosepieces and may also be used with the older Nikon Illuminator "Universal Epi-Illuminator EPI-U" (page 29 of Appendix A) on top of the arm while using the lower round dovetail nosepiece.

In this way, the various focusing device implementations can be used simultaneously with both the older Nikon illuminators and with the new Nikon illuminators without requiring separate versions depending on the microscope type. This ability to universally fit older and new microscopes using the same focusing device part may assist with greater adoption of the focusing device beyond just what the benefit of the additional precision capability provided by the piezoelectric function of the device would provide.

In places where the description above refers to particular implementations of piezoelectric operated microscope focusing devices and implementing components, sub-components, methods and sub-methods, it should be readily apparent that a number of modifications may be made without departing from the spirit thereof and that these implementations, implementing components, sub-components, methods and sub-methods may be applied to other piezoelectric operated microscope focusing device.

What is claimed is:

1. A piezoelectric operated microscope focusing device comprising:
   a first block, having a first side and a second side, the first side configured to couple to a body of a microscope through four or more screws;
   a second block, having a first surface, a second surface, and a side surface, the side surface fixedly coupled to the second side of the first block, the second surface of the second block configured to couple with an objective of the microscope, wherein the second block has a shape that is substantially square; and
   an opening comprised on the first surface of the second block, the opening configured to couple to an illuminator of the microscope, the opening comprising a substantially rounded portion and an adapter opening oriented substantially perpendicular to the first block of the device, the adapter opening comprising mounting screw openings, the adapter opening configured to receive an adapter therein comprising dove tail projections.

2. The device of claim 1, wherein a piezoelectric material is contained within a cylinder positioned between the first side and the second side of the first block, the piezoelectric material subjected to bias force using a spring.

3. The device of claim 2, wherein the piezoelectric material is one of a crystal and a ceramic.

4. The device of claim 1, wherein the four or more screws are arranged in a rectangular formation.

5. The device of claim 1, wherein the illuminator further comprises one or more viewing lenses.

6. The device of claim 1, further comprising a bracket coupled to the second surface of the second block configured to couple with the objective of the microscope, the bracket comprising two or more square shaped wings and a pin, a first wing positioned on an edge of the second surface opposite the first block, the first wing comprising a thumb screw configured to secure the objective of the microscope, and the pin positioned adjacent the second wing configured to stop and position the objective when the objective is inserted into the two or more square shaped wings.

7. A piezoelectric operated microscope focusing device comprising:
   a first block, having a first side and a second side, the first side configured to couple to a body of a microscope through two or more screws;
   a second block, having a first surface, a second surface, and a side surface, the side surface fixedly coupled to the second side of the first block, the second surface of the second block configured to couple with an objective of the microscope, wherein the second block has a shape that is substantially square; and
   an opening comprised in the first surface of the second block, the opening configured to couple to an illuminator of the microscope, the opening comprising a substantially square shaped portion and an adapter oriented substantially parallel to the first block of the device, the adapter comprising two dovetail projections and at least one mounting screw.

8. The device of claim 7, wherein a piezoelectric material is contained within a cylinder positioned between the first side and the second side of the first block, the piezoelectric material subjected to bias force through a spring.

9. The device of claim 8, wherein the piezoelectric material is one of a crystal and a ceramic.

10. The device of claim 7, further comprising four or more screws comprised on the first side of the first block, wherein the four or more screws are arranged in a rectangular formation.

11. The device of claim 7, wherein the illuminator further comprises at least one viewing optic.

12. The device of claim 7, further comprising a bracket coupled to the second surface of the second block configured to couple with the objective of the microscope, the bracket comprising two or more square shaped wings and a pin, a first wing positioned on an edge of the second surface opposite the first block, the first wing comprising a thumb screw configured to secure the objective of the microscope, and the pin positioned adjacent the second wing configured to stop and position the objective when the objective is inserted into the two or more square shaped wings.

13. A piezoelectric operated microscope focusing device comprising:
   a first block, having a first side and a second side, the first side configured to couple to a body of a microscope through two or more screws;
   a second block, having a first surface, a second surface, and a side surface, the side surface coupled to the second side of the first block;
   an opening in the first surface of the second block configured to couple with a light source of the microscope; and
   a bracket coupled to the second surface of the second block configured to couple with an objective of the microscope, the bracket comprising two or more flanges and a pin, a first flange positioned on an edge of the second surface opposite the first block, the first flange comprising a thumb screw configured to secure the objective of the microscope, and the pin positioned adjacent a second flange configured to stop and position the objective while the objective is inserted into the two or more flanges.

14. The device of claim 13, wherein a piezoelectric material is contained within a cylinder positioned between the first side and the second side of the first block, the piezoelectric material subjected to bias force using a spring.

15. The device of claim 14, wherein the piezoelectric material is one of a crystal and a ceramic.

16. The device of claim 13, further comprising four or more screws comprised on the first side of the first block, the four or more screws arranged in a rectangular formation.

17. The device of claim 13, wherein the light source is an illuminator.

18. The device of claim 13, wherein the opening comprises a substantially rounded portion and an adapter oriented substantially perpendicular to the first block of the device, the adapter comprising two dove tail projections and at least one mounting screw.

19. The device of claim 13, wherein the opening comprises a substantially square shaped portion and an adapter oriented substantially parallel to the first block of the device, the adapter comprising two dove tail projections and at least one mounting screw.

\* \* \* \* \*